(12) United States Patent
English et al.

(10) Patent No.: US 12,049,069 B2
(45) Date of Patent: Jul. 30, 2024

(54) FABRIC WITH FLOW RESTRICTING CORE

(71) Applicant: SWNR Development, LLC, Pagosa Springs, CO (US)

(72) Inventors: Dustin English, Pagosa Springs, CO (US); Timm Smith, Pagosa Springs, CO (US); Daniel L. English, Pagosa Springs, CO (US)

(73) Assignee: SWNR Development, LLC, Pagosa Springs, CO (US)

( * ) Notice: Subject to any disclaimer, the term of this patent is extended or adjusted under 35 U.S.C. 154(b) by 11 days.

(21) Appl. No.: 17/965,588

(22) Filed: Oct. 13, 2022

(65) Prior Publication Data
US 2023/0030706 A1 Feb. 2, 2023

Related U.S. Application Data

(62) Division of application No. 16/713,923, filed on Dec. 13, 2019, now abandoned.
(Continued)

(51) Int. Cl.
*B32B 5/06* (2006.01)
*B32B 5/02* (2006.01)
(Continued)

(52) U.S. Cl.
CPC ............... *B32B 5/06* (2013.01); *B32B 5/26* (2013.01); *B32B 7/09* (2019.01); *B32B 5/022* (2013.01)

(58) Field of Classification Search
CPC .. B32B 5/06; B32B 5/26; B32B 5/022; B32B 5/245; B32B 5/18; B32B 7/09; B32B 2266/0228; B32B 2266/08; B32B 2266/0235; B32B 2266/126; B32B 2250/40; B32B 2250/03;
(Continued)

(56) References Cited

U.S. PATENT DOCUMENTS 3,619,336 A * 11/1971 Hughes .................... D04H 1/52
428/102
4,863,788 A * 9/1989 Bellairs .................. D06N 3/186
427/407.1
(Continued)

FOREIGN PATENT DOCUMENTS

DE         3502936 A  * 7/1986  ............ A41D 31/02
WO    2012073096 A1      6/2012

OTHER PUBLICATIONS

Espacenet Translation of DE-3502936-A (Year: 2024).*
(Continued)

*Primary Examiner* — Michael Zhang
(74) *Attorney, Agent, or Firm* — Conley Rose, P.C.; William H. Dietrich

(57) ABSTRACT

A stitched fabric including a barrier layer; a yarn stitched through and forming stitch holes in the barrier layer, and a foam core formed over the barrier layer. A melted portion of the barrier layer fills at least a portion of the stitch holes. The foam core is prevented from progressing further into the stitched fabric by the barrier layer. As such, the barrier layer is configured to control a depth to which the foam core penetrates into the stitched fabric. The foam core may be formed over at least a portion of the yarn. A second foam core may be formed on a side of the barrier layer opposite the foam core.

13 Claims, 6 Drawing Sheets

Related U.S. Application Data

(60) Provisional application No. 62/779,824, filed on Dec. 14, 2018.

(51) Int. Cl.
*B32B 5/26* (2006.01)
*B32B 7/09* (2019.01)

(58) Field of Classification Search
CPC ...... B32B 2262/0261; B32B 2262/106; B32B 2255/26; B32B 2255/10; B32B 2437/02; B32B 2307/728; B32B 2307/73; B32B 2307/7265
See application file for complete search history.

(56) References Cited

U.S. PATENT DOCUMENTS

| | | | |
|---|---|---|---|
| 8,597,760 | B2 | 12/2013 | Woods, II et al. |
| 9,028,944 | B2 | 5/2015 | Woods, II et al. |
| 9,272,486 | B2 | 3/2016 | Lumb et al. |
| 2007/0020398 | A1 | 1/2007 | Lai et al. |
| 2014/0075646 | A1 | 3/2014 | Henssen et al. |
| 2014/0134391 | A1 | 5/2014 | Lumb et al. |
| 2014/0356574 | A1 | 12/2014 | Conolly et al. |
| 2017/0065013 | A1 | 3/2017 | Choudhry |
| 2020/0189228 | A1 | 6/2020 | English et al. |

OTHER PUBLICATIONS

Office Action dated Apr. 9, 2021; U.S. Appl. No. 16/713,923, filed Dec. 13, 2019; 9 pages.
Office Action dated Jul. 2, 2021; U.S. Appl. No. 16/713,923, filed Dec. 13, 2019; 7 pages.
Final Office Action dated Nov. 15, 2021; U.S. Appl. No. 16/713,923, filed Dec. 13, 2019; 9 pages.
Advisory Action dated Jan. 14, 2022; U.S. Appl. No. 16/713,923, filed Dec. 13, 2019; 3 pages.
Office Action dated Feb. 7, 2022; U.S. Appl. No. 16/713,923, filed Dec. 13, 2019; 6 pages.
Final Office Action dated Apr. 19, 2022; U.S. Appl. No. 16/713,923, filed Dec. 13, 2019; 5 pages.
Advisory Action dated May 3, 2022; U.S. Appl. No. 16/713,923, filed Dec. 13, 2019; 4 pages.
Office Action dated Sep. 21, 2022; U.S. Appl. No. 16/713,923, filed Dec. 13, 2019; 11 pages.
English, Dustin, et al.; U.S. Appl. No. 18/149,262, filed Jan. 3, 2023; Title: Fabric with Flow Restricting Core; 25 pages.
Final Office Action dated Jan. 11, 2023; U.S. Appl. No. 16/713,923, filed Dec. 13, 2019; 10 pages.

* cited by examiner

FABRIC WITH FLOW RESTRICTING CORE

CROSS-REFERENCE TO RELATED APPLICATIONS

This is a divisional of co-pending U.S. patent application Ser. No. 16/713,923 filed on Dec. 13, 2019, by Dustin English, et al., entitled "Fabric with Flow Restricting Core," which claims priority to U.S. Provisional Application No. 62/779,824 filed Dec. 14, 2018, by Dustin English, et al., entitled "Fabric with Flow Restricting Core," each of which is incorporated herein by reference as if reproduced in its entirety.

BACKGROUND

Controlling the depth to which foaming chemicals or coating materials penetrate a fabric is difficult due to the nature of the foaming process. Indeed, foaming chemicals or coating materials often expand or flow in a non-uniform manner. As such, a fabric incorporating these foaming chemicals or coating materials may suffer from irregularities such as, for example, changing thickness, an uneven look or feel, and so on.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Disclosed herein is a fabric or article incorporating or benefiting from a foam core. By constructing a soft, stretchable, lightweight knit with a foam core (e.g., closed cell aerogel foam core), an improved garment or article (e.g., coats, jackets, hats, gloves, footwear, watch bands, bicycle frames, beverage coolers, etc.) with enhanced properties may be produced.

Figure 1:
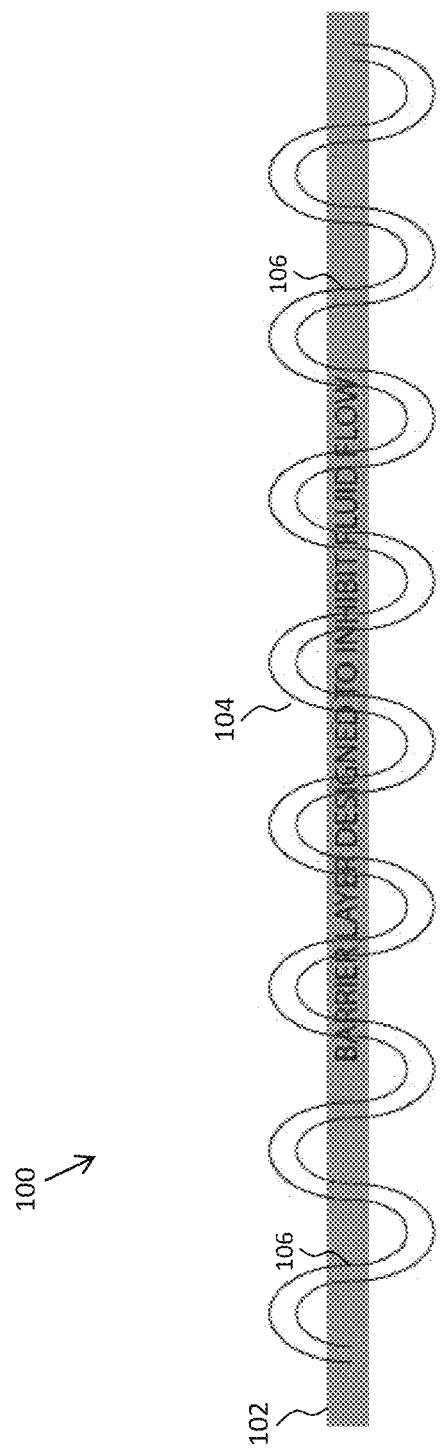
FIG. 1 is a cross section of an embodiment of an initial stage of a stitched fabric having a barrier layer stitched through by a yarn.

Referring to FIG. 1, an embodiment fabric 100 in an initial stage is illustrated. The fabric 100 may have a variety of beneficial properties. For example, in an embodiment the fabric 100 is soft, stretchable, able to wick away moisture, and so on. As shown in FIG. 1, in an embodiment the fabric 100 in this initial stage includes a barrier layer 102 and a yarn 104.

In an embodiment, the barrier layer 102 is configured to inhibit fluid flow. In other words, the barrier layer 102 is generally liquid resistant or waterproof. Therefore, the barrier layer 102 functions to discourage fluid flow through the fabric 100. In addition, in an embodiment the barrier layer 102 is also windproof, yet still permits the fabric 100 to be breathable. In other words, the barrier layer 102 is able to block wind from undesirably passing through the fabric 100 while still permitting moisture vapor generated by, for example, body heat to be dissipated.

Still referring to FIG. 1, the yarn 104 is stitched through the barrier layer 102. In an embodiment the yarn 104 is a polyester or polyester-blend yarn, a nylon or nylon-containing yarn, a carbon fiber yarn, or other type of yarn. The yarn 104 may be chemically or otherwise treated to resist stains, repel moisture, resist flames, or provide other beneficial properties.

As shown, in an embodiment the yarn 104 is stitched through more than a majority (e.g., greater than 50%) of the barrier layer 102. In other words, the yarn 104 is stitched over a substantial portion of the length and width of barrier layer 102. Depending on how tightly the stitching is performed, the yarn 104 may permit portions of the underlying barrier layer 102 to be visible or may obscure all or a portion of the underlying barrier layer 102.

In an embodiment, the fabric 100 of FIG. 1 is constructed by stitching a polyester yarn 104 through the barrier layer 102 such that the majority of the surface area of the barrier layer 102 is covered. During the stitching process, the yarn 104 forms stitch holes 106 through the barrier layer 102 as shown in FIG. 1. In some circumstances, it is desirable to seal off or plug these stitch holes 106. As will be more fully explained below, some or all of the stitch holes 106 formed by the yarn 104 are partially or fully filled when the barrier layer 102 is sufficiently heated. For example, the barrier layer 102 may be heated to a thermoplastic state, which allows a portion of the barrier layer 102 to flow and plug a portion of the stitch holes 106 in the barrier layer 102.

Figure 2:
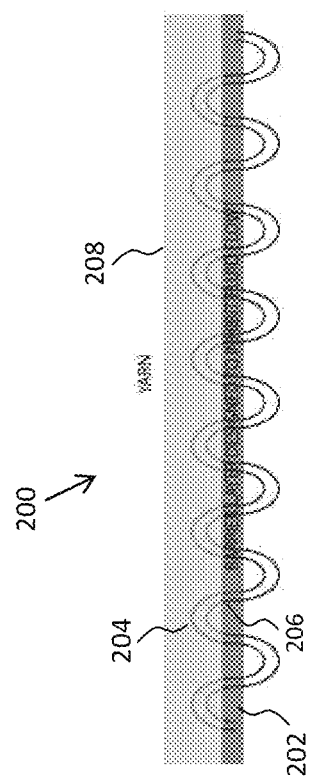
FIG. 2 is a cross section of an embodiment of a stitched fabric having a foam core disposed over a barrier layer.

Referring now to FIG. 2, a fabric 200 including a barrier layer 202, a yarn 204, and a foam core 208 is illustrated. Similar to the fabric 100 of FIG. 1, the fabric 200 includes stitch holes 206 that have been partially or fully filled after the barrier layer 202 is heated. However, the fabric 200 also incorporates the foam core 208 on one side of the barrier layer 202. As shown, the barrier layer 202 controls the depth to which the foam core 208 penetrates into the fabric 200. For example, the barrier layer 202 prevents the foam core 208 from progressing further downwardly into the fabric 200 as oriented in FIG. 2. Indeed, by putting the barrier layer 202 (or other membrane) in the fabric 200 at the desired depth, the depth to which the foam core 208 penetrates the fabric can be precisely controlled.

In an embodiment, the barrier layer 202 may support or include a radiant reflective film. That is, a radiant reflective film may be disposed upon a surface of the barrier layer 202 or incorporated into the barrier layer 202. In an embodiment, the radiant reflective film on or in the barrier layer 202 prevents or inhibits radiant energy from entering an article (e.g., a beverage cooler). In an embodiment, the radiant reflective film prevents or inhibits radiant energy from exiting the interior of an article (e.g., a beverage cooler).

In an embodiment, the barrier layer 202 is a non-woven fabric. In such an embodiment, the yarn 204 is stitched through the barrier layer 202. However, the stitch holes 206 that are formed are not plugged by melting a portion on of the barrier layer 202 as described elsewhere herein.

In an embodiment, a beverage cooler may be formed using a fabric 200 containing a barrier layer 202 benefitting from a radiant reflective film (e.g., a soft side beverage cooler). In an embodiment, the barrier layer 202 is moisture vapor permeable. Therefore, any steam generated by hot items placed in the beverage cooler is allowed to escape. As such, the steam does not condense inside the beverage cooler, which helps keeps the items therein both hot and dry.

In an embodiment, the foam core 208 comprises any structure having pockets of gas trapped in a liquid or solid. In an embodiment, the foam core 208 comprises a closed cell aerogel foam, a polyurethane foam (i.e., foam rubber), a polystyrene foam, a polyvinyl chloride (PVC) foam, and so on. In an embodiment, the foam core 208 has either hydrophobic or hydrophilic surfaces. In an embodiment, the foam core 208 comprises a non-foaming coating (e.g., polyurethane).

In an embodiment, a stitched fabric (e.g., fabric 200) includes a barrier layer (e.g., barrier layer 202), a yarn (e.g., yarn 204) stitched through and forming stitch holes (e.g., stitch holes 206) in the barrier layer, where a melted portion of the barrier layer fills at least a portion of the stitch holes, and a coating (e.g., foam core 208, non-foaming coating, etc.) formed over the barrier layer. In an embodiment, the coating is prevented from progressing further into the stitched fabric by the barrier layer. In an embodiment, the coating comprises a polyurethane, another suitable polymer (e.g., Polycarbonate, Polyether-Polycarbonate, Polyether-Polyester, etc.), or a coating containing or formed from a polymer resin. In an embodiment, the coating is non-foaming. In an embodiment, the barrier layer supports or includes a radiant reflective film.

In an embodiment, a stitched fabric (e.g., fabric 200) includes a non-woven barrier layer (e.g., barrier layer 202), a yarn (e.g., yarn 204) stitched through and forming stitch holes (e.g., stitch holes 206) in the non-woven barrier layer, and a foam core (e.g., foam core 208) formed over the non-woven barrier layer. In an embodiment, the non-woven barrier layer includes or supports a radiant reflective film. In an embodiment, the foam core is prevented from progressing further into the stitched fabric by the non-woven barrier layer. In an embodiment, the non-woven barrier layer is configured to control a depth to which the foam core penetrates into the stitched fabric.

In an embodiment, a stitched fabric (e.g., fabric 200) includes a non-woven barrier layer (e.g., barrier layer 202), a yarn (e.g., yarn 204) stitched through and forming stitch holes (e.g., stitch holes 206) in the barrier layer, and a coating (e.g., foam core 208, non-foaming coating, etc.) formed over the non-woven barrier layer. In an embodiment, the coating is prevented from progressing further into the stitched fabric by the barrier layer. In an embodiment, the coating comprises a polyurethane, another suitable polymer (e.g., Polycarbonate, Polyether-Polycarbonate, Polyether-Polyester, etc.), or a coating containing or formed from a polymer resin.

Figure 3:
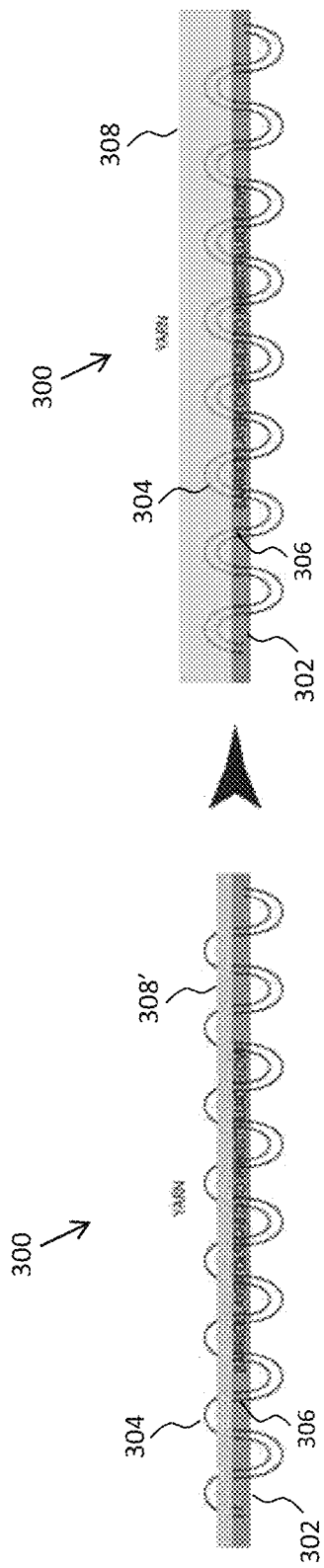
FIG. 3 is a cross section of an embodiment of a stitched fabric having a foam core formed from a foaming agent.

Referring now to FIG. 3, in an embodiment the foam core 308 begins as a foaming agent 308'. As shown, the foam agent 308' is applied over the barrier layer 302, which has already been heated to close off the stitch holes 306. The foam agent 308' is subjected to heat or some other catalyst until it fully or sufficiently expands. As shown in FIG. 3, the foam core 308 formed from the foam agent 308' may completely cover the yarn 304 on one side of the fabric 300.

Figure 4:
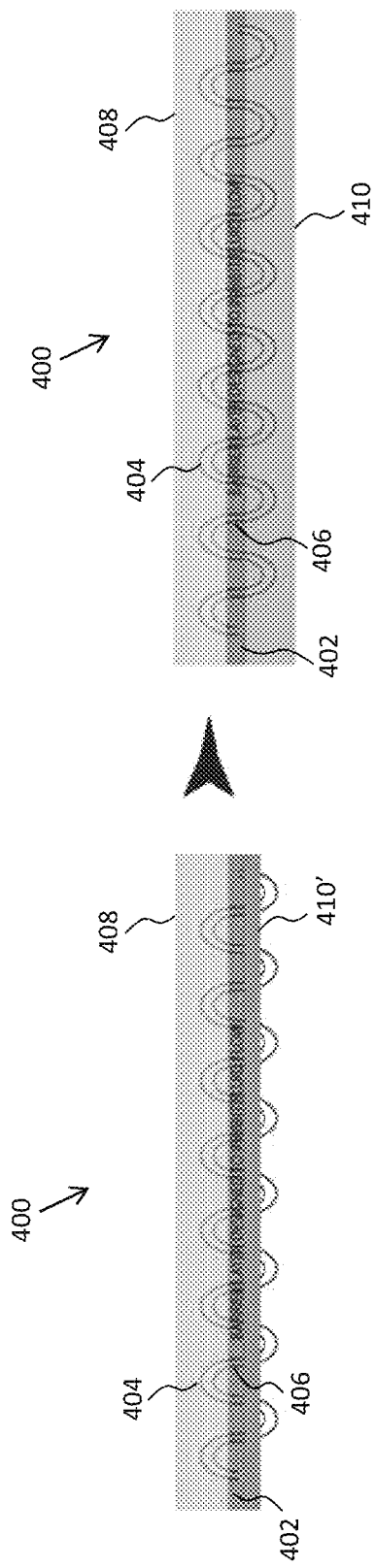
FIG. 4 is a cross section of an embodiment of a stitched fabric having a second foam core formed from a second foaming agent.

Referring now to FIG. 4, in an embodiment a second foam core 410 is formed on a side of the fabric 400 opposite the initially formed foam core 408. The second foam core 410 begins as a foaming agent 410'. The second foam core 410 may be the same as or different than the first foam core 408. As shown, the foam agent 410' is applied over the barrier layer 402 on a side opposite the foam core 408. The barrier layer 402 has already been heated to close off the stitch holes 406. The foam agent 410' is subjected to heat or some other catalyst until it fully or sufficiently expands. As shown in FIG. 4, the foam core 410 formed from the foam agent 410' may completely cover the yarn 404 on one side of the fabric 400. Thus, the fabric 400 may have two precisely controlled foam cores 408, 410.

Figure 5:
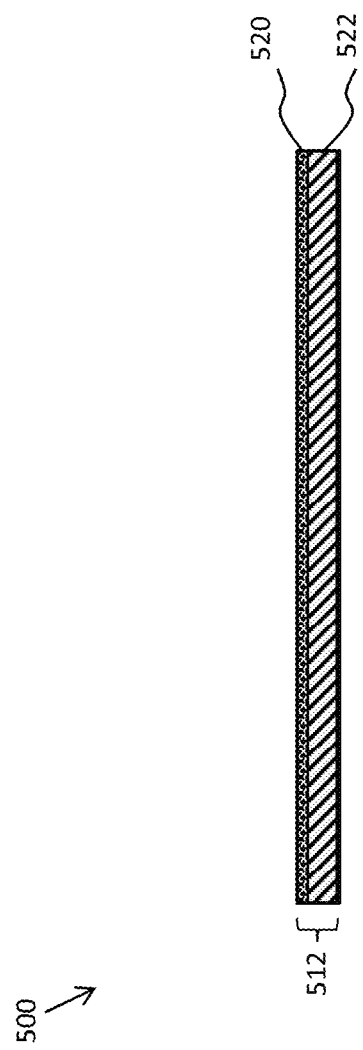
FIG. 5 is a cross section of an embodiment of a composite barrier layer suitable for use in the fabrics of FIGS. 1-4.

In FIG. 5, a composite barrier layer 512 that may be used in the fabrics 100-400 is illustrated. In an embodiment, the barrier layer 512 comprises an adhesive 520 and an intermediate material 522 (e.g., a porous membrane or a non-porous film) as shown in FIG. 5. In an embodiment, the barrier layer 512 may include several adhesive 520 layers and/or several intermediate layers 522.

A melting point of the adhesive 520 is generally lower than a melting point of the intermediate material 522. Therefore, the adhesive 520 may be melted without also melting the intermediate material 522. In other words, the adhesive 520 may be forced to flow through the application of sufficient heat without flowing, or compromising the integrity of, the intermediate material 522.

In an embodiment, the melting point of the adhesive 520 may be between about 140° C. to about 180° C. (about 284° F. to about 356° F.) while the melting point of the intermediate material 522 exceeds about 180° C. (about 356° F.). Where the adhesive 520 and the intermediate material 522 have different distinct melting points as noted above, the barrier layer 512 may be referred to as having an "A-B" type format. In an embodiment, the adhesive 520 is approximately two thousandths of an inch (i.e., 2 mils) and the intermediate material 522 is approximately one thousandth of an inch (i.e., 1 mil).

In general, the adhesive 520 is a thermoplastic, copolyamide, or other suitably meltable type of material capable of bonding two layers of fabric together. A variety of different adhesives 520 may be used in the barrier layer 512. By way of example, the adhesive 520 may be a high-quality textile adhesive such a polyurethane adhesive film, an ethylene-vinyl acetate, and the like. In an embodiment, the adhesive 520 may be heat sensitive, pressure sensitive, or both.

The intermediate material 522 of the barrier layer 512 may be either a membrane or a film formed from a variety of different materials. In an embodiment, the intermediate material 522 is formed from polyurethane, polyester, urethane, polyether, polytetrafluoroethylene (PTFE), or another polymer-based material. The intermediate material 522 may be manufactured using, for example, an extrusion, a melt blowing, or an electrospinning process.

As shown in FIGS. 1-4, the fabric 100-400 is free of any other layer (e.g., a face layer or an interior layer) disposed over the foam core 208, 308, 408, 410 or over the exposed barrier layer 202, 302 (see FIGS. 2-3). As such, the barrier layer 202-302, the yarn 204-304, and/or the foam core 208, 308, 408, 410 are free from contact by another layer on either side of the barrier layer 102-302 and/or foam core 208, 308, 408, 410. In an embodiment, the foam core 308, the barrier layer 302, and the yarn 304 are free from contact by another layer as shown in FIG. 3. Even so, in an embodiment other layers (e.g., a face layer, an interior layer, etc.) may be added to the fabrics.

In an embodiment, a resin or other coating chemistry may be used in place of any of the foam cores disclosed herein. The resins may be used in conjunction with, for example, carbon fibers to form the fabrics. In an embodiment, the composite fabrics 100-400 with the foam cores are thermo-moldable.

Figure 6:
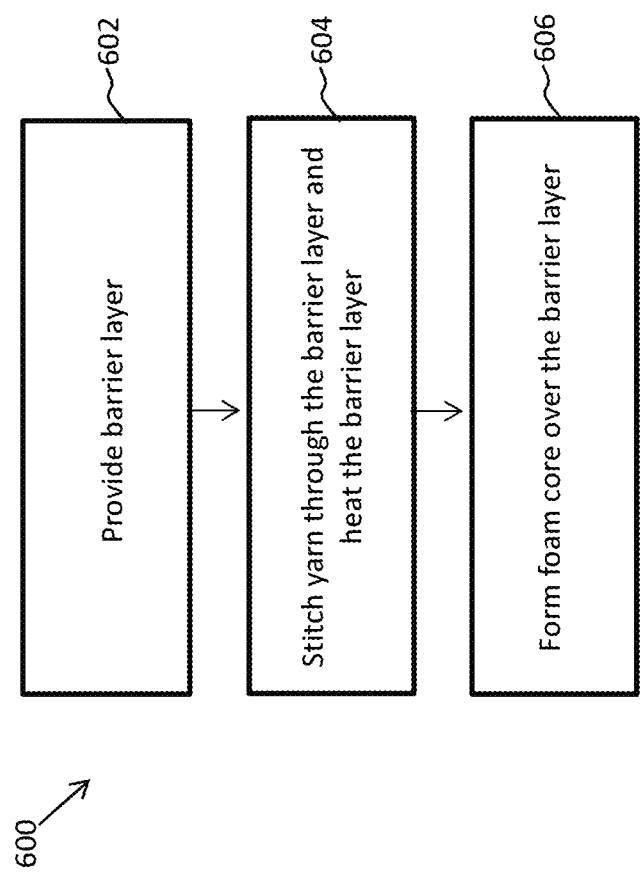
FIG. 6 is an embodiment of a method of forming the stitched fabric of FIG. 2.

In FIG. 6, a method 600 of forming the fabric 200 of FIG. 2 is illustrated. In step 602, a barrier layer 202 is provided. In step 604, a yarn 204 is stitched through the barrier layer and the barrier layer 202 is heated as described herein to at least partially fill the stitch holes 206. In step 606, a foam core 208 is formed over the barrier layer 202. In an embodiment, the barrier layer 202 and the foam core 208 are subjected to heating at the same time. As such, the foam core 208 is produced at the same time as the stitch holes 206 are closed off. In an embodiment, a second foam core (e.g., foam core 410) may be formed on an opposing side of the stitched fabric 200 as the barrier layer 202.

What is claimed is:

1. A stitched fabric, comprising:
   a barrier layer;
   a yarn stitched through and forming stitch holes in the barrier layer, wherein a melted portion of the barrier layer fills at least a portion of the stitch holes; and
   a foam core formed over the barrier layer,
   wherein the foam core comprises a single layer that abuts the barrier layer, and
   wherein the stitched fabric is free of any other layer disposed over the foam core.

2. The stitched fabric of claim 1, wherein the foam core is prevented from progressing further into the stitched fabric by the barrier layer.

3. The stitched fabric of claim 1, wherein the barrier layer is configured to control a depth to which the foam core penetrates into the stitched fabric.

4. The stitched fabric of claim 1, wherein the foam core is formed over at least a portion of the yarn.

5. The stitched fabric of claim 1, wherein the foam core completely covers the yarn on one side of the stitched fabric.

6. The stitched fabric of claim 1, wherein the foam core extends over an entire length and width of the barrier layer.

7. The stitched fabric of claim 1, wherein the foam core comprises a polyvinyl chloride (PVC) or a polyurethane.

8. The stitched fabric of claim 1, wherein at least one surface of the foam core is hydrophobic or hydrophilic.

9. The stitched fabric of claim 1, wherein a second foam core is formed on a side of the barrier layer opposite the foam core.

10. The stitched fabric of claim 1, wherein a melted portion of the barrier layer entirely fills the stitch holes.

11. The stitched fabric of claim 1, wherein the barrier layer comprises a first material with a first melting point and a second material with a second melting point lower than the first melting point.

12. The stitched fabric of claim 1, wherein the yarn is one of a polyester yarn and a carbon fiber.

13. The stitched fabric of claim 1, wherein the foam core comprises an expanded foam agent.

* * * * *